United States Patent [19]
Wilshaw et al.

[11] Patent Number: 6,030,704
[45] Date of Patent: Feb. 29, 2000

[54] GRANULAR MATERIALS COMPRISING INORGANIC SILICON-CONTAINING MATERIAL

[75] Inventors: Nicholas John Goodwin Wilshaw; Keith Robert Rogan, both of Cornwall, United Kingdom

[73] Assignee: ECC International Ltd., United Kingdom

[21] Appl. No.: 08/877,841

[22] Filed: Jun. 18, 1997

[30] Foreign Application Priority Data

Jun. 21, 1996 [GB] United Kingdom ............... 9613113

[51] Int. Cl.⁷ ........................................ B32B 5/16
[52] U.S. Cl. ..................... 428/404; 210/661; 428/407
[58] Field of Search ................................. 428/403, 404, 428/407; 210/661

[56] References Cited

U.S. PATENT DOCUMENTS

| | | | |
|---|---|---|---|
| 2,367,384 | 1/1945 | Tymstra et al. | 201/1 |
| 3,983,081 | 9/1976 | Dieterich et al. | 521/100 |
| 4,097,422 | 6/1978 | Markusch | 521/154 |
| 4,097,423 | 6/1978 | Dieterich | 521/154 |
| 4,536,315 | 8/1985 | Ramachandran et al. | 252/174.11 |
| 4,549,996 | 10/1985 | Beall | 210/661 |
| 5,028,482 | 7/1991 | Jeffs | 428/323 |
| 5,055,429 | 10/1991 | James et al. | 501/80 |
| 5,418,195 | 5/1995 | Kostuch et al. | 501/80 |

FOREIGN PATENT DOCUMENTS

| | | |
|---|---|---|
| 331283 | 9/1989 | European Pat. Off. . |
| 740014A1 | 10/1996 | European Pat. Off. . |
| 764617A1 | 3/1997 | European Pat. Off. . |
| 986635 | 3/1965 | United Kingdom . |
| 1386359 | 3/1975 | United Kingdom . |
| 2067174 | 7/1981 | United Kingdom . |
| 2271987 | 6/1996 | United Kingdom . |
| WO91/03317 | 3/1991 | WIPO . |

*Primary Examiner*—Hoa T. Le
*Attorney, Agent, or Firm*—Finnegan, Henderson, Farabow, Garrett and Dunner, L.L.P.

[57] ABSTRACT

A granular material for the sorption of organic material comprises granules of an inorganic silicon-containing material having negatively charged sites and having an average granule size of at least 50 microns, the granules being porous and coated on their outer and inner surfaces with a film of an organic polymeric material having polar and non-polar moieties. The organic polymeric material may form from 0.25% to 10% by weight of the weight of the inorganic material.

The granular material may be prepared by treating an aqueous suspension of the inorganic material with a material comprising the organic polymeric material. The inorganic silicon-containing material may comprise a silicate, eg. an aluminosilicate, eg. a kandite and/or smectite clay which may be a foamed material which has been calcined. The polymeric material may comprise a nitrogen-containing polymer which can be employed in the form of an acid colloidal medium, eg. a melamine-aldehyde polymer.

19 Claims, 2 Drawing Sheets

GRANULAR MATERIALS COMPRISING INORGANIC SILICON-CONTAINING MATERIAL

BACKGROUND OF THE INVENTION

The present invention relates to granular materials, particularly for sorbing organic materials especially solvents, oils and fats.

The present invention concerns, in particular, granules which are effective in sorbing organic material from a mixture of media containing the organic material, eg. organic material and water. The granules of the invention are useful, for example, for separating oil and other water immiscible pollutants from contaminated sea and river water and other aqueous bodies.

Many industries are faced with the problem of disposing of liquid wastes comprising a suspension or emulsion of an oily or water immiscible organic material in an aqueous medium. Environmental regulations forbid the discharge of such a liquid waste directly to a water course, and the waste must be treated in order to remove as completely as possible the organic material from the aqueous medium before the latter can be discharged to a convenient water course.

Various methods have been proposed for separating mixtures of water and organic pollutants. Many make use of an organoclay as the separating medium. An organoclay is generally a fine particulate, high surface area smectite or kandite clay, the surface of which has been rendered hydrophobic and oleophilic by treatment with a cationically active amine or quaternary ammonium compound which has at least one long chain alkyl group containing at least 8 carbon atoms. The positively charged nitrogen atom of such a reagent is attracted to, and bonds with, negative charges on the surface of the clay particles, while the long chain alkyl group extends outwardly from the surface of the clay particles and bonds with the molecules of the organic pollutants.

U.S. Pat. No. 2,367,384 (Tymstra) describes a method for removing small quantities of water-immiscible organic oily impurities from water. The method consists of contacting the oily composition with an inert solid coated with a cation surface-active bonding agent. The solid may be sand, clay, limestone, silica, rice hulls etc., and the cationic surface-active bonding agent may be a quaternary ammonium, phosponium or arsonium compound, a primary, secondary or tertiary amine, or a salt thereof.

U.S. Pat. No. 4,549,966 (Beall) describes a method for removing organic contaminants from an aqueous composition contaminated therewith. The method comprises contacting the aqueous composition with a sufficient amount of an organoclay for a sufficient length of time to absorb a substantial portion of the contaminant, and to form an aqueous organoclay admixture. The organoclay and aqueous composition are then separated from one another. The method is said to be particularly useful for separating oily contaminants such as humic acids and polychlorinated biphenyls from water contaminated therewith.

SUMMARY OF THE INVENTION

According to the present invention there is provided a granular material for the sorption of organic material which comprises granules of a silicon-containing inorganic material having negatively charged sites and having an average granule size of at least 50 microns (micrometers), preferably at least 100 microns, the granules being porous and coated on their outer and inner (pore) surfaces with a film of an organic polymeric material having both polar (ie. positively charged) and non-polar (ie. oleophilic) moieties.

DETAILED DESCRIPTION OF THE INVENTION

The organic polymeric material preferably comprises at least one nitrogen-containing polymer having one or more triazine rings, although it could alternatively or in addition comprise a quaternary ammonium compound, eg. having optionally substituted alkyl groups, eg. containing ten or more carbon atoms, as one or two of its substituent groups.

The organic polymeric material may be one in which the polymer chain is formed by a condensation reaction. The organic polymeric material preferably exists as a polymer prior to addition to the inorganic material, ie. requires no further essential treatment to achieve polymerisation or cross-linking after addition to the inorganic silicon-containing material.

The inorganic material employed in the granular material according to present invention may be formed by comminution, eg. crushing, of bodies or pieces, eg. pellets or prills, of foamed ceramic material formed from a silicon-containing material having the required negatively charged sites. The foamed ceramic material may be material which has been calcined prior to coating with the said film.

The silicon-containing material may comprise a silicate-containing material, eg. an aluminosilicate.

Various methods are known in the prior art for the production of foamed ceramic material and the foamed ceramic material which may be employed to form by calcination and comminution the inorganic material of the coated material according to the present invention may be prepared by one of these various methods. Thus, the foamed ceramic material may be produced by one of the methods described in prior patent specifications GB986,635; and GB2,067,174B using a silicate-containing material, eg. an alumino-silicate, as the starting material.

The foamed ceramic material may advantageously be prepared by the method disclosed in Patent Specification GB2,271,987B in which a ceramic granular foam material is prepared by:

(a) preparing a foam from a mineral, eg. clay, slurry;

(b) dividing the foam into discrete pellets or prills to form granules; and (c) calcining the granules at an elevated temperature.

The pellets or prills may be dried prior to treatment in a calcining furnace.

The foamed ceramic material employed to form the granular material according to the present invention itself desirably comprises granules which incorporate bubbles or cells or parts thereof. Such granules are described for example in GB2,271,987B. The bubbles produced by the method described therein are polyhedral bubbles of varying sizes bounded by thin walls, the walls and junctions between walls generally bounding two or usually more bubbles. Granules larger than 50 $\mu$m, preferably larger than 100 $\mu$m, will usually incorporate a plurality of such bubbles or parts thereof.

The material which is employed to form the foamed ceramic material (from which the particulate material according to the present invention is obtained) may comprise any one or more of the known silicon-containing minerals and/or synthetic materials from which ceramics having negatively charged sites may be formed.

Ceramics comprises a broad class of non-metallic, inorganic materials from which solid articles may be made. Such materials have a high melting or sublimation point. For example, known ceramics include traditional ceramics e.g. clay products, cements, and the like which have been known and used for many centuries and also ceramics which have found uses in less traditional applications, which are known as "new ceramics" e.g. various pure or mixed oxides, carbides and nitrides.

The inorganic particulate material employed to form foamed ceramic material for use in making material according to the present invention preferably comprises one or more silicates or other silica-containing materials, eg. one or more aluminosilicates. The silicon-containing compound(s) may comprise silica or one or more silicates of, for example, calcium, magnesium or aluminium. The compound(s) may be a naturally-occurring mineral, such as talc, a clay mineral, mica or wollastonite, or may be synthetic. Preferably the compound is an aluminosilicate, for example a clay mineral of the kandite and/or smectite type. Clay minerals of the kandite group, for example kaolinite, dickite, nacrite and halloysite, have been found to be particularly advantageous. "Kaolinite" includes kaolin type clays, ball clays, fire clays and China clays. Such clays occur in nature (and may be used) in the form of kaolinite plus other minerals, eg. one or more of illite, mica, quartz and feldspar. The kandite clay mineral may be used in its natural, hydroxylated or hydrous state. Where the aluminosilicate comprises a smectite clay it may comprise for example one or more of bentonite, hectorite and saponite.

In general, suitable ceramics can be formed from particulate inorganic materials which are either obtained as minerals or are manufactured synthetically or a mixture of both.

Where the foamed ceramic material employed to produce material according to the invention is formed from one or more mineral materials (optionally together with synthetic material) the mineral(s) may for example be one or more of the naturally occurring minerals described above.

Where the foamed ceramic material is formed from one or more synthetic ceramic forming materials (optionally together with mineral material), the material(s) may in general be selected from the wide range of synthetic materials, eg. synthetic aluminosilicates, known to form ceramics having negatively charged sites.

Generally, the foamed ceramic material may comprise porous granules substantially all of which are composed of inorganic particles which have been sintered together, the bulk density of the material preferably being no greater than 0.75 g·cm$^{-3}$. The granules may have a largest dimension of up to 10 mm or more in size although the preferred granule size range is from 100 microns (0.1 mm) to 3 mm.

The granules preferably have a bulk density of at least 0.120 g·cm$^{-3}$. Preferably, the bulk density is no greater than 0.700 g·cm$^{-3}$.

The mineral and/or synthetic material employed to produce the required foamed ceramic material will generally be employed initially as particulate material incorporated in a suitable liquid medium in which a suitable suspension or dispersion can be formed. Suitable liquid media are known in relation to the formation of ceramic materials from the various classes of known material. In many cases, especially where the particulate material comprises a mineral, a suitable liquid medium comprises water or an aqueous solution. Foam may be made from the liquid medium by a process involving incorporating a gas in the liquid. The liquid may contain a surface active agent or surfactant to form a stable froth.

Examples of suitable surface active agents include known cationic, anionic, non-ionic and amphoteric surface active agents. Non-ionic agents are preferred.

The gas may for example be air incorporated by agitating the liquid medium to form a froth. The gas may be added to the liquid medium before or after the particulate material (and other optional additives) is added thereto.

Conveniently, as described in GB2,067,174B, an aqueous foam containing a surface active agent may be formed prior to addition to the ceramic forming particulate material. The aqueous foam may be added to a paste or slurry containing the particulate material. The addition may conveniently be carried out in an extrusion machine from which foamed ceramic material is to be extruded. The machine may be a screw extruder, eg. a co-rotating twin screw extruder. The machine may extrude foamed ceramic material into a plurality of individual elongate portions. The portions may be divided by allowing extrudate to fall onto a moving belt which by the action of carrying away the material causes lengths or portions to break from the extruding material. In any event, the portions or pellets so formed may be collected and sized by one or more screen meshes, e.g. so that only lengths of a given size range, eg. not less than 50 $\mu$m, preferably between 10 $\mu$m and 3 mm, are selected. The selected portions may be further treated by drying and then calcining as described hereinafter.

The foamed ceramic material produced in the manner described may incorporate one or more additive materials added at one or more of the stages of producing such material or after its production. The foamed ceramic material may, for example, incorporate one or more of a fluxing material, for example forming from 5 percent to 50 percent by weight of the mixture with the particulate material (mineral and/or synthetic material), the fluxing agent comprising for example mica or feldspar, which subsequently reduces the temperature at which the material may be calcined, a biocide e.g. forming up to 1 percent by weight of the solids portion of the foamed ceramic material, or an organic or inorganic binder or filler or a combustible material, e.g. forming up to 30 percent by weight of the solids portion of the foamed ceramic material.

A particular method of forming the ceramic particulate material used to produce material according to the present invention comprises the following steps:

(a) preparing a foam from an aqueous mixture of a particulate ceramic forming material and a fluxing agent;

(b) calcining the foam at an elevated temperature to form a calcined foamed ceramic material;

(c) crushing the calcined foamed ceramic material; and (d) separating the granules obtained after crushing so that those having a suitable average diameter may be further treated.

Calcining may be carried out in a known manner. The temperature and time of the calcining will depend on the material being calcined and the amount of fluxing agent present but, for example, material comprising clay may be calcined at a temperature typically in the range 800 C. to 1600 C. for a period of 5 minutes to 24 hours.

The crushing employed to form the granules of the material according to the present invention may be performed by a device which exerts a gradual pressure or controlled squeezing action on the calcined foamed ceramic which may be present in the form of prills or pellets typically having a length of from 1 mm to 10 mm. This action causes the calcined foamed ceramic to fracture at its weakest points, which are generally the thin bubble or cell walls. The device requires an adjustable discharge gap by which the crushing surfaces are spaced apart during the crushing. Suitable devices which have such an adjustable discharge gap include smooth roll crushers, cone crushers and gyratory crushers.

Following crushing, the granules of the inorganic material to form material according to the present invention may be separated eg. by one or more screens or other known separators into size ranges. Particles having average sizes not less than 50 μm, preferably in the range 100 μm to 3 mm, are treated further as described hereinafter. Particles separated as fines may form the fractal shaped granules the subject of EP764617A.

Where the porous inorganic material having negatively charged sites produced as described hereinbefore is to be coated with a nitrogen-containing polymer to provide the said film of organic polymeric material, the nitrogen-containing polymer may be produced by the reaction of an amino derivative of a symmetric triazine, such as melamine or a substituted melamine, with an aldehyde having not more than 8 carbon atoms, formaldehyde, acetaldehyde and propionaldehyde being especially preferred. The reaction mixture may also contain minor proportions of other compounds having two or more amino groups, for example urea and/or dicyandiamide. EP-A1-0569085 gives examples of suitable polymers. The molecular weight of the polymer is preferably in the range from 500 to 50,000, most preferably in the range from 500 to 5,000. Suitable melamine aldehyde-type polymers are commercially available from Calgon Corporation, Pittsburgh USA, under the tradenames CA-289 and WT-2511 and SURROUND. These products have molecular weights of about 2,000 to 5,000.

The amount of the organic polymeric material used to coat the particles of the inorganic material has been found to be important, but varies according to the nature of the inorganic material. For example, when the inorganic material has a relatively high cation exchange capacity, as, for example, with smectite clays, the amount required will be in the range from 6% to 12% by weight, based on the weight of the inorganic material. When the inorganic material is silica, which has a cation exchange capacity in an intermediate range, the amount required will be in the range from 3% to 6% by weight, based on the weight of the silica. Calcined kandite clays and porous ceramic granules formed therefrom as described in GB-A-2271987, which are of relatively low cation exchange capacity, require from 0.5% to 1.5% by weight, preferably from 0.7% to 1.3% by weight, based on the weight of the inorganic material compound, of the polymeric material.

The porous inorganic material may be coated on its outer surface and in its cavities and pores by a film of the polymeric material in various ways which are known per se. For example, the coating may be achieved by contacting of an aqueous suspension containing the inorganic material with the polymeric material. Alternatively, the granules of the inorganic material may be dried and evacuated in a vacuum vessel and the polymeric material may be contacted with the inorganic material in the vessel. The polymeric material may be contained in a suitable aqueous and/or organic solvent when it is added.

The polymeric material having both polar and non-polar groups, eg. nitrogen-containing polymer, will have a cationicity which varies with pH. This will affect the physical form of the polymer when contained in an aqueous medium. At very low pH values the polymer will exist for months as discrete, highly stable colloidal particles with a high level of hydrophilicity. On the other hand, at high pH values the cationicity of the polymer is insignificant giving a very low level of hydrophilicity (ie., a high level of hydrophobicity).

In consequence, where the polymer is added in an aqueous medium to the inorganic material the uptake of the polymer by the anionic sites present on the granules of the inorganic material will vary with pH. Significant uptake will occur over a pH range which will be generally from pH1 to pH7. This is the pH range at which the polymer contacts the particles of the inorganic material. For example, the uptake of melamine formaldehyde by calcined porous kaolin is especially significant over the range pH2 to pH5.

Thus, for coating where the polymer or the inorganic material or both is contained in an aqueous medium, the pH of the polymeric material when it contacts the inorganic material should preferably be in the range pH2 to pH5. The polymer added to the inorganic material may be in a medium having a lower pH, eg. pH1 to pH4 immediately prior to addition. For example, the pH of the medium may be less than pH2. The medium may comprise a suitable acidic aqueous medium, eg. a solution of hydrochloric acid of pH less than 2.0. The polymer may form from 1% to 20%, eg. from 5% to 15%, by weight of the solution or suspension containing it (prior to addition to the inorganic material). The polymer may be present in the form of colloidal droplets or particles in the acidic medium containing it. The droplets or particles may have an average size mainly in the range of from 10 nm to 100 nm, especially 40 nm to 600 nm, for example from 400 nm to 600 nm.

Where the porous inorganic material is treated as an aqueous suspension to provide coating by the polymeric material, the aqueous suspension conveniently contains from 20% to 60%, eg. from 20% to 40%, by dry weight of the porous material.

The amount of polymeric material in the material added to the inorganic material to provide a suitable coating thereon is conveniently in the range 0.02% to 3% by weight, especially 0.5% to 1.5% by weight, of the dry weight of the inorganic material present.

After the inorganic material has been coated with the polymeric material, the polymeric material may remain as a coating over the surfaces thereof. This is in contrast to coated porous material produced in the prior art for other purposes, wherein a surface polymer coating may be removed from the outer surfaces of an inorganic material to which it has been applied to be absorbed by the inorganic material.

We have found that materials according to the present invention are surprisingly advantageous as materials for the sorption of organic material, especially hydrophobic substances such as solvents, oils or fats mixed with water or aqueous media which need to be separated therefrom. The porous nature of the granules of the inorganic material may provide a crater-like profile containing numerous pores and cavities which provide an extensive surface area and voidage. Desirably, the porous granules have average pore sizes (measured as specified hereinafter), in the range 100 nm to 10,000 nm. The organic polymeric material provides a surface coating which possesses both polar groups, which bind to the negatively charged sites on the external and internal (porous) surfaces of the inorganic material and non-polar groups which bind to the organic material being sorbed.

The surface area of the polymer coated inorganic material including the pores and cavities thereof is preferably at least 2 square meters per gramme, preferably between 4 $m^2g^{-1}$ and 8 $m^2g^{-1}$. Such a material can have a very high capacity for the sorption of organic liquids especially solvents, oils and fats. For example, a material having a surface area of 5 to 6 $m^2g^{-1}$ can surprisingly and beneficially absorb as much as typically 200 μmol per gramme of fat, whereas a fat absorption of only 60 to 70 μmol per gramme of absorber is normal and usually expected with conventional fat absorbers such as organoclays as used in the prior art having a comparable surface area.

Fat absorption capability may be determined by reference to absorption of triolein which is the most commonly found naturally occurring fat. This compound is also a completely hydrophobic molecule or 'hydrophobe' and therefore is a good model for hydrophobic material in general.

Because the material according to the present invention can take up more organic material than comparable prior art materials it can then sorb larger quantities of solvents, oils and fats etc. per amount of material used.

Desirably, the inorganic material is a porous metakandite, eg. metakaolin, which has negatively charged sites on its surface (including those of its pores and cavities) and the organic polymeric material desirably comprises a melamine aldehyde polymer, eg. a melamine formaldehyde. Such an organic polymeric material has a high positive charge density and forms an efficient water repellent skin (of monomolecular thickness) on the surface of the porous inorganic material including the pores and cavities thereof by providing a plurality of linked chains having positively charged sites which bond to the surface negatively charged sites.

The granules of the material according to the present invention may be used in a variety of known applications for the sorption of organic materials such as organic solvents, oils and fats especially where they have to be separated from other materials, eg. wet solids or other liquids or gases. The organic material to sorbed could alternatively comprise an organic gas, vapour, solid, semi-solid or gel. The material according to the invention may be scattered as individual granules on solids, semi-solids, liquids containing the organic material to be sorbed, or may alternatively be packed or fused together as beds or columns or the like to provide a barrier to organic vapours, gases or liquids in a flowing system, eg. a gaseous, gas/liquid or liquid flow, eg. a liquid containing aqueous and organic phases to be separated.

Convenient granule sizes range from 50 μm up to about 3 mm or more. Granules of from 0.1 mm to 3 mm average size are preferred.

Examples of applications in which the material according to the present invention may be used include: filters for flowing gases or liquids especially flows from which oils are to be separated, barriers for use in soil or land remediation separation of oils or fats from water or aqueous solutions in aqueous domestic systems, tanks, reservoirs, ponds, lakes, rivers and seas and in aqueous effluent streams, eg. from chemical, mineral or other industrial plants, eg. paper processing plants and the like. Because the material is lightweight it floats on water and is particularly useful in dealing with oil slicks. It can be skimmed from the water after sorbing the oil.

The material according to the present invention may be useful in separating organic liquids from aqueous liquids in processes in which organic and aqueous phases are present together with hazardous species, eg. radioactive or toxic particles or ions, the material according to the present invention assisting the procedures for separation of such phases.

When the material according to the present invention has been employed to sorb organic material the material may be disposed of by a suitable waste disposal procedure or, alternatively, the organic material sorbed may be recovered, eg. by a suitable solvent treatment process.

EP0740014A concerns an agent for controlling pitch in paper making comprising a particulate inorganic silicon-containing compound coated with a nitrogen-containing polymer having one or more triazine rings, and a method of its preparation. The silicon-containing compound is conveniently silica or a silicate of calcium, magnesium or aluminium. Most advantageously, the silicon-containing compound is a kandite clay, such as kaolin. In this material the particles are much smaller, eg. typically 1–2 μm, and would be unsuitable for use in the applications of the present invention described herein. Conversely, the material of the present invention is not particularly useful in pitch control applications because it is too coarse.

Embodiments of the present invention will now be described by way of example with reference to the accompanying drawings, in which:

Figure 1:
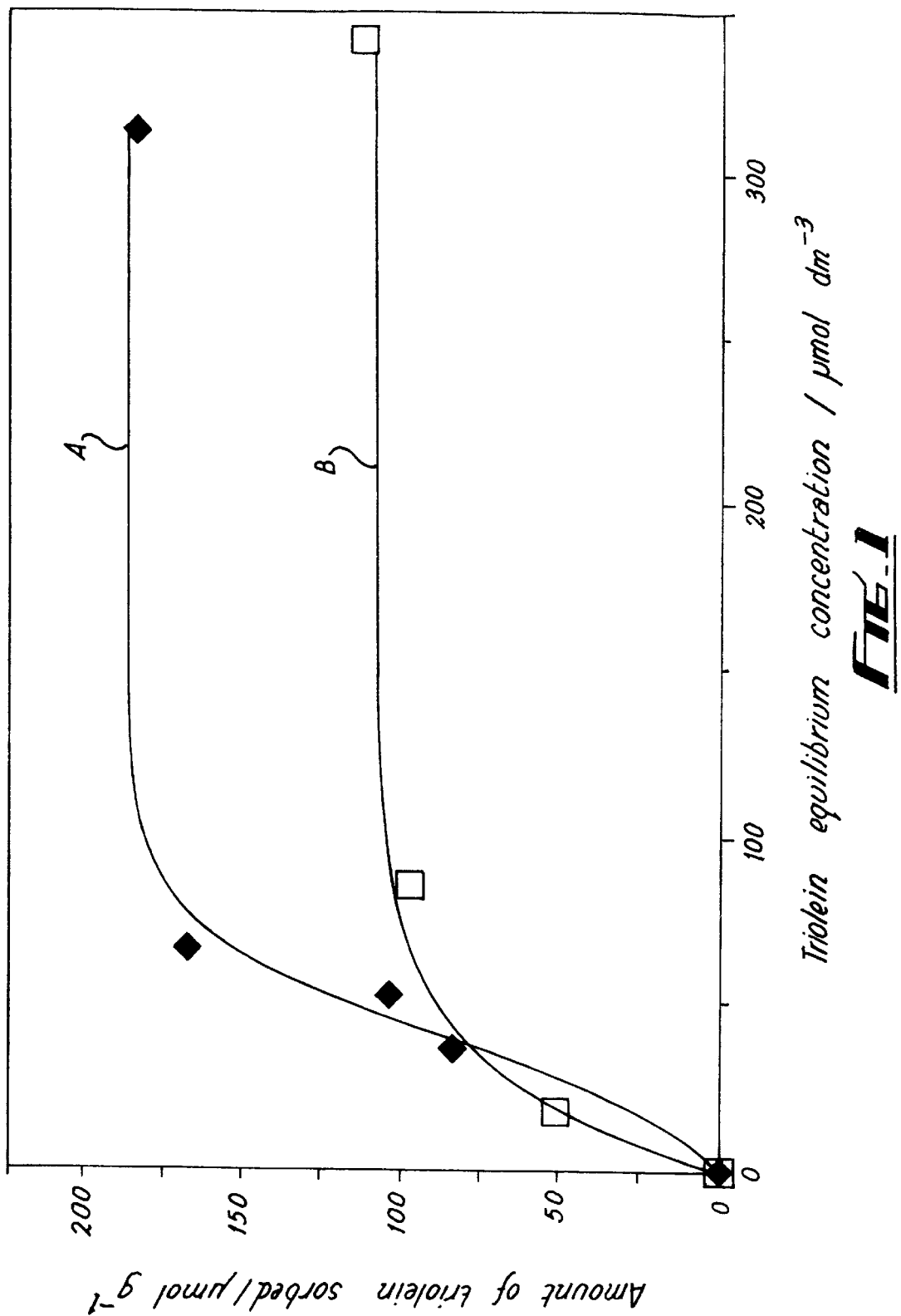
FIG. 1 is a graph of triolein sorption versus triolein concentration for material (a) embodying the invention and (b) conventionally used in the prior art.

The following examples illustrate the preparation, properties and use of material embodying the present invention.

EXAMPLE 1

An English ball clay was fed as a substantially dry powder at a rate of 15 kg·$hr^{-1}$ into the feed inlet of a twin screw, co-rotating extruder. At the same time sufficient water to form a suspension containing 50% by weight of dry ball clay was injected through inlets provided in the casing of the extruder. The ball clay had a particle size distribution such that 85% by weight consisted of particles having an equivalent spherical diameter smaller than 2 μm and the following mineralogical composition:

| | |
|---|---|
| kaolinite | 56% by weight |
| mica | 34% by weight |
| quartz | 10% by weight |

There was also introduced, through an inlet situated approximately midway between the feed inlet and the extruder plate, foam, which had been separately generated by passing under pressure through a fine mesh a mixture of air, water and a cationic surfactant, which was a higher alkyl trimethyl quaternary ammonium chloride, the higher alkyl component being a mixture of alkyl groups having from 13 to 15 carbon atoms. The amount of foam added was such that there were present 5 liters of foam per kilogramme of ball clay suspension. The foamed clay mixture was extruded through a plurality of apertures of diameter 20 mm and the extruded foamed clay was found to have a density of 550 kg·$m^{-3}$. The noodles produced by extrusion were dried for 16 hours at 80° C. and the noodles were loaded into refractory saggars and were passed through a calcining tunnel kiln. The residence time in the tunnel kiln was 24 hours and the maximum temperature to which the noodles were exposed was 1525° C. The calcined noodles were crushed in a jaw crusher and the crushed material was screened on a sieve having an aperture size of 2 mm. The crushed material used as the oil sorbent was that which passed through the sieve. This material was found to have an actual average size in the range of from 1.4 mm to 1.7 mm, and a pore structure with pore diameters, as measured by mercury porosimetry, in the range of from 100 nm to 10,000 nm.

45 g of the dry ceramic foam granules, prepared as described above, was added to 105 g of distilled water in a stainless steel mixing pot. The resultant suspension, which contained 30% by dry weight of granules, was thoroughly stirred to allow the surface of the granules to become completely wetted. 5.625 g of an 8% by weight, acidified to pH 1.9 with hydrochloric acid, colloidal suspension of a melamine-formaldehyde polymer was added dropwise to the granule suspension which was continuously stirred. The particle size distribution by mass of the colloidal suspension of the melamine formaldehyde polymer was bimodal with the major amount of mass having a size of about 500 nm and the minor amount of mass having a size of about 50 nm. The amount of melamine-formaldehyde polymer used was sufficient to provide 1 by weight of the polymer, based on the dry weight of the granules. The stirring was continued for a further 30 minutes after the addition of the melamine-formaldehyde polymer had been completed. The pH of the mixture was then found to be 3.1. The suspension was filtered on a Whatman No.542 hardened ashless filter paper and the cake of solid material produced was dried in a current of air in a fan oven at 30° C. for 16 hours. The dried cake was then pulverised. A sample of the dried and pulverised cake was found to have a specific surface area, as measured by the BET nitrogen adsorption method, of 6.4 $m^2 \cdot g^{-1}$ and the oil sorption capacity of the pulverised material was tested in the following manner.

Samples to simulate oil-contaminated waste water were prepared by mixing various different amounts of triolein, measured in micromoles ($\mu$mol), with 10 cm³ of ethanol. Each 10 cm³ sample of solution of triolein in ethanol was mixed with 99 g of water, to give a triolein oil-in-water emulsion, and there were then added thereto 1 g samples of the oil sorbent granules described above.

In each case the oil sorbent granules were shaken with the diluted suspension of triolein for 15 minutes, after which the solid component of the mixture was removed by means of a centrifuge and the triolein which remained in suspension unsorbed by the granules was extracted first with 10 cm³ of hexane and then with three successive 10 cm³ aliquots of chloroform. The hexane and chloroform solutions were combined together in a vessel and the solvents were removed by passing a current of air through the mixed solutions at 60° C. to leave a deposit of fat on the walls of the vessel. This triolein deposit was then extracted with 20 cm³ of the mobile phase of a high performance liquid chromatography (HPLC) system and the solution shaken for 30 minutes. A small quantity of the solution was then injected into an HPLC column and the quantity of triolein measured by determining the area of the appropriate peak. The difference between the original quantity of triolein introduced and the quantity of triolein present in the hexane and chloroform solvents gave the quantity which had been sorbed by the granules.

A graph was plotted of the amount of triolein sorbed in $\mu$mol per gramme of granules against the concentration of triolein in the aqueous phase with which the granules had been contacted. The graph is shown in FIG. 1. As seen in FIG. 1, a plateau value was reached for the amount of triolein sorbed, which remained substantially constant as the concentration of triolein in the aqueous phase was increased. This plateau value was recorded as an indicator of the oil sorbtion capacity of the granules. This is curve A in FIG. 1. A maximum possible triolein uptake was calculated from these results and the dose of triolein applied (220 $\mu$mol) using the Langmuir equation and was found to be 219 $\mu$mol·g$^{-1}$. This value is surprising in that it is much higher than that obtained for an organoclay of comparable surface area. For example, curve B in FIG. 1 shows the triolein sorption capacity of an organoclay "OC". The plateau figure for organoclay OC was found to be 120 $\mu$mol·g$^{-1}$. "OC" is identical to pitch control agent F described in Example 1 of our EP 96301664.7.

Based upon surface area available, the triolein sorption of the porous granules embodying the invention of specific surface area 6.4 $m^2 \cdot g^{-1}$ would be expected to be of the order of 64 $\mu$mol·g$^{-1}$. However, the triolein sorption of the granular material embodying the present invention is surprisingly high, and far in excess of the expected 64 $\mu$mol·g$^{-1}$. This is because the granules possess in their pore structure a voidage, which is readily hydrophobised with melamine formaldehyde, and which can then sorb, ie. adsorb and adsorb, large quantities of triolein. Apparently, the melamine formaldehyde coats and hydrophobises the walls of the pore structure in the granules having negatively charged sites, and thereby makes this pore structure more receptive to oleophilic material, such as oil. On contact with an oil-polluted water for example, such as an oil-in-water emulsion, this melamine formaldehyde-treated, porous sorbent takes up the oil both by sorption on to its external surfaces and, most importantly, by sorption into its pore structure voidage, where the oil completely floodfills this hydrophobically-coated voidage. Surprisingly and beneficially, about two thirds of the total amount of oil sorbed is taken up into the pore structure voidage of the sorbent granules, with the remainder being taken up on to external surfaces.

It is the flood-filling of pore voids which gives rise to the much greater uptake of oil by the materials of the present invention than that uptake which is expected purely on the basis of the surface area of the invention—which only measures area of surfaces and not voidage volumes.

Figure 2:
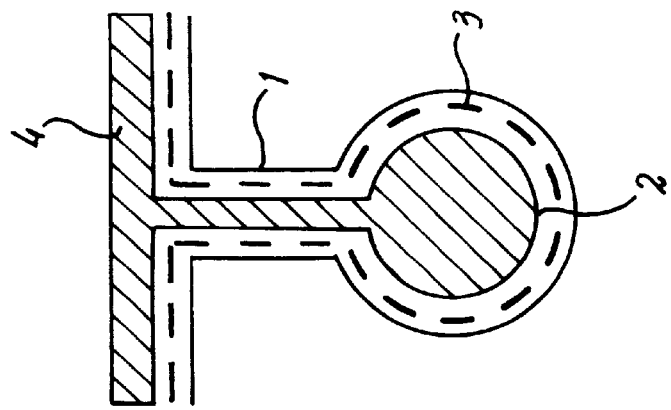
FIG. 2 is an illustration showing the sorption of organic material by a coated inorganic material embodying the present invention.
Figure 2:
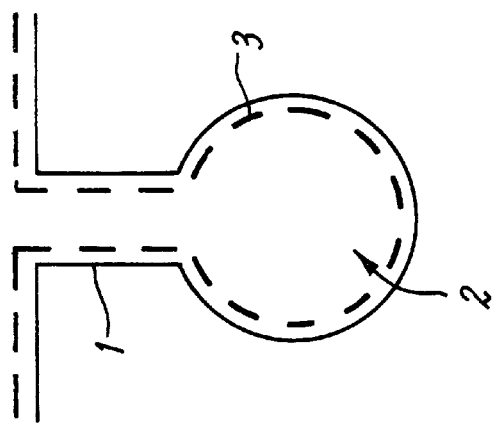
Figure 2:
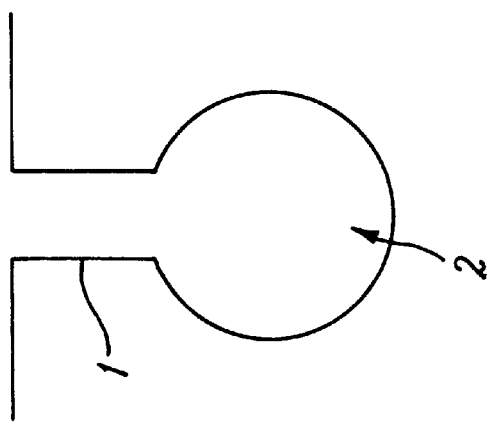

This effect is illustrated in FIG. 2. Part of the surface 1 of a porous inorganic granule having negatively charged sites is indicated in FIG. 2(a). An open cavity 2 is formed in the surface 1 as part of the porous structure. In FIG. 2(b), the surface 1 of the granule including the interior surface of the cavity 2 is coated with a film 3 of an organic polymeric material, eg. a melamine aldehyde polymer, having both polar and non-polar groups. In FIG. 2(b), an oleophilic material, 4, eg. an oil or fat, is sorbed by the coated surface of the granule and occupies not just the regions adjacent to the coated surface but also the space inside the cavity 1.

We claim:

1. A granular material for the sorption of organic material comprising granules of an inorganic silicon-containing material having negatively charged sites and having an average granule size ranging from about 0.1 mm to about 3 mm, the granules being porous calcined, foamed ceramic material and coated on their outer and inner surfaces with a film of an organic polymer material having polar and non-polar moieties, the surface area of the coated inorganic material including the pores and cavities thereof being at least 2 $m^2$/g of said granular material.

2. A granular material as claimed in claim 1 and wherein the organic polymeric material forms from 0.25% to 10% by weight of the weight of the inorganic material.

3. A granular material as claimed in claim 1 wherein the material has been prepared by treating an aqueous suspension of the inorganic material with a material comprising the organic polymeric material.

4. A granular material as claimed in claim 3 and wherein the aqueous suspension contains from 20% to 60% by dry weight of the porous inorganic material.

5. A granular material as claimed in claim 1 and wherein the porous inorganic material has been coated by drying and evacuating the porous inorganic material and adding the polymeric material thereto following evacuation.

6. A granular material as claimed in claim 1 wherein the material comprising the polymeric material comprises colloidal particles having sizes in the range of from 10 nm to 1000 nm.

7. A granular material as claimed in claim 6 and wherein the polymeric material immediately prior to addition to the inorganic material is contained in an aqueous medium having a pH in the range pH1 to pH4.

8. A granular material as claimed in claim 1 wherein the material comprising the organic polymeric material forms from 0.02% to 3% by weight of the coated inorganic material, based upon the dry weight of the inorganic material.

9. A granular material as claimed in claim 1 and wherein the foamed ceramic material from which the porous inorganic material has been prepared has been prepared by:

a) preparing a foam from a slurry of a particulate material;

b) dividing the foam into discrete prills or pellets to form granules; and c) calcining the granules at an elevated temperature.

10. A granular material as claimed in claim 1 and wherein the inorganic material comprises a foamed material comprising one or more silicate-containing compounds.

11. A granular material as claimed in claim 10 and wherein the foamed inorganic material comprises one or more aluminosilicates.

12. A granular material as claimed in claim 11 and wherein the foamed inorganic material has been formed from a clay mineral of the kandite and/or smectite type.

13. A granular material as claimed in claim 12 and wherein the clay mineral has been calcined prior to coating with the said film.

14. A granular material as claimed in claim 13 and wherein the nitrogen-containing polymer is a melamine aldehyde polymer.

15. A granular material as claimed in claim 1 and wherein the organic polymeric material comprises at least one nitrogen-containing polymer.

16. A granular material as claimed in claim 15 and wherein the nitrogen-containing polymer has one or more triazine rings.

17. A granular material as in claim 15 and wherein the nitrogen-containing polymer is a melamine-formaldehyde polymer and the inorganic material is a calcined foamed kaolin.

18. A method for processing a granular material of claim 1 comprising:

(a) drying said porous inorganic material; and (b) adding to said porous inorganic material an organic polymeric material, comprising colloidal particles having sizes ranging from 100 nm to 10,000 nm to coat the inner and outer surfaces of said porous inorganic material.

19. A method of claim 18, further comprising:

after step (a) evacuating said porous inorganic material.

* * * * *